Patented Oct. 27, 1931

1,829,116

UNITED STATES PATENT OFFICE

SPERANZA SEAILLES, NÉE CALOGEROPOULOS AND JEAN SEAILLES, OF PARIS, FRANCE, ASSIGNORS, BY MESNE ASSIGNMENTS, TO ALFRED P. BOURQUARDEZ

PROCESS FOR THE COATING OF METALS UPON CEMENT SURFACES

No Drawing. Application filed September 25, 1924, Serial No. 739,919, and in France September 29, 1923.

This invention relates to a process for the coating of metals upon the surface of aluminum cement or Portland hydraulic cements, or like hydraulic cements.

The said process is characterized by the fact that a sheet of gold, silver, copper or other metal, which is prepared in a thin state by means known in the metal-working industry, such as the gold-beating or like processes, is placed against the wall of the mould to which it is temporarily attached, either by a light sprinkling with pure cement or a mixture of cement and sand, or by a slight moistening, or by like means.

One then runs into the mould the cement in the properly mixed condition, and it is then submitted to compression, pounding or to repeated shocks or vibrations, or to a sufficiently strong centrifugal action. The cement is allowed to set and harden in the mould, and when the finished piece is removed from the mould, the metal will be found to have undergone a veritable petrifaction and to have become integral with the cement.

The mould has preferably a polished or enamelled surface.

The metals may also be used in the powdered form, mixed up with water or other liquid subject to evaporation, or mixed with vehicles which offer no obstacle to the setting of the cement. The metallic paste thus prepared is coated upon the walls of the mould, and the remainder of the process is carried out as above stated.

When a sheet of metal is employed, it may preferably be in a very thin state, thus showing an appreciable transparency to light, as is the case for thin sheets of gold obtained by the gold-beating process, and for like metals so treated.

But when the said thin sheets or leaves are utilized, two or more leaves must be applied in order to obtain a continuous and regular coating. Should only one leaf be applied, one will obtain surfaces having a discontinuous metal coating, and consisting partly of the metal surface and partly of the cement surface; this will on the other hand afford an agreeable decorative effect due to the alternations of the cement and the metal upon the surface.

This decorative effect may be heightened as well as varied, by disposing the metal sheets so as to leave various places which are free from the metal, thus obtaining marbled or streaked effects; even veritable designs or lettering can be thus obtained.

As concerns the metal powders formed into a paste or paint, these can be employed in a uniform layer, or in other cases marbled surfaces, designs or lettering may be obtained. By the use of polished or enamelled moulds, the cement portions of the surface will have brilliant and polished aspect, and this offers a decorative effect which is most attractive.

After the pieces thus manufactured have been removed from the mould and set to dry for several days, it is preferable to give them a coating of an oily or fatty substance such as linseed oil, paraffin and the like in the hot or cold state or in solution; the surface is then wiped dry to remove the excess of the substance which is not absorbed, and the result will be a more even and uniform appearance, and the cement is thus made waterproof and is at the same time rendered more attractive.

The surface may then be waxed by the known methods if desired.

In order to apply the metal upon a coloured backing, either uniform or varied, the cement is coloured or decorated according to current practice, thus obtaining all suitable decorative effects.

By the use of aluminous cements and polished or enamelled moulds, one may obtain products which offer the greatest interest by reason of their brilliancy and strength, as well as remarkable effects in the domain of the decorative art.

What we claim is:

A process for the coating of metals upon cement surfaces in which the metal is disposed upon the walls of a mould in the form of a powder mixed with a volatile substance offering no prejudice to the setting of the cement, the cement being then run into the mould, subjected to compression by suitable means, allowed to dry, and finally removed from the mould.

In testimony whereof we have signed this specification.

Mrs. SEAILLES, née SPERANZA CALOGEROPOULOS.
JEAN SEAILLES.